(No Model.)  F. B. STEVENS.  2 Sheets—Sheet 1.
GAGE AND LEVEL INDICATING DEVICE FOR RAILROAD TRACKS.
No. 325,706.  Patented Sept. 8, 1885.
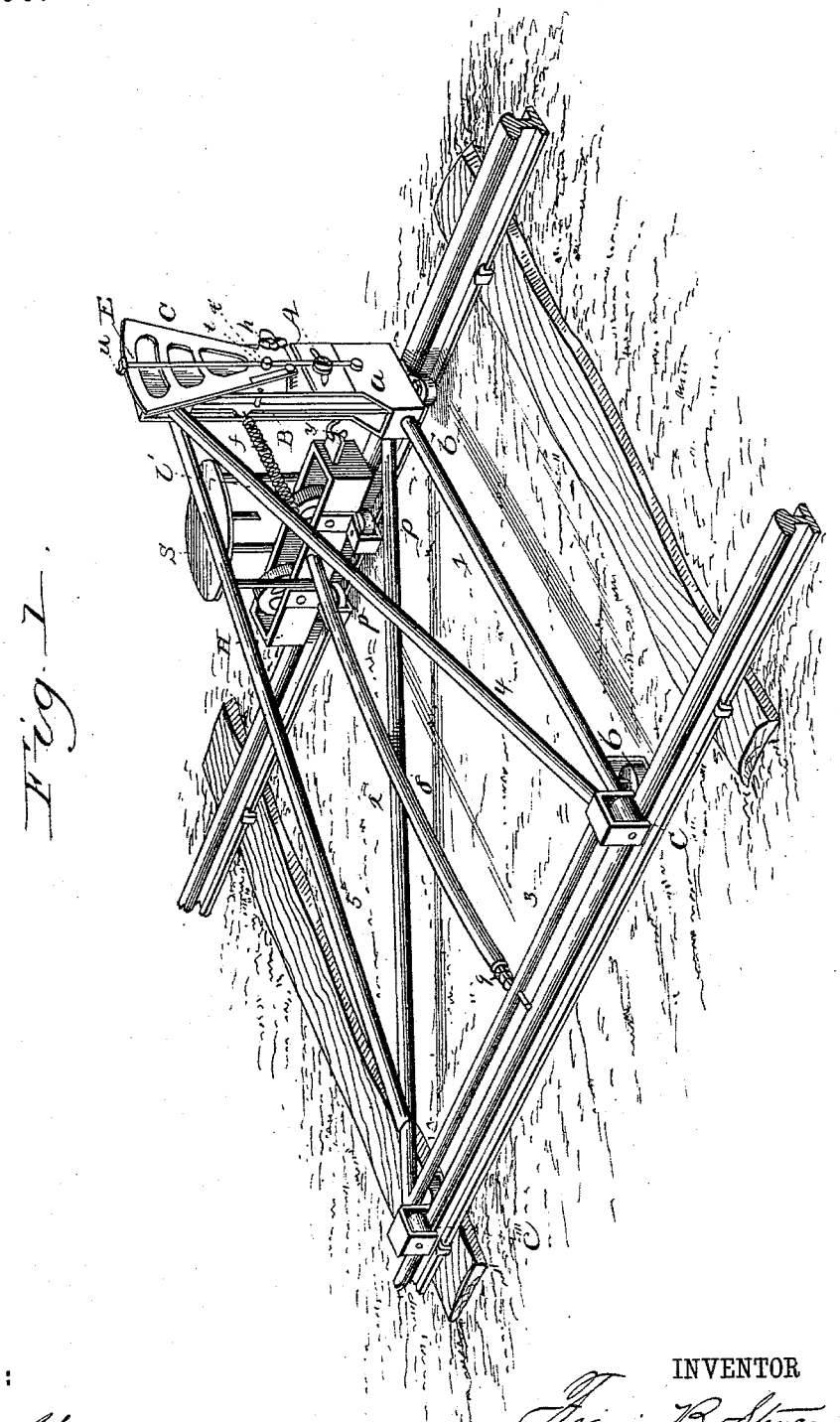
WITNESSES:
J. M. Reynolds
E. Everett Ellis
INVENTOR
Francis B. Stevens
BY O. E. Duff
ATTORNEY (No Model.) 2 Sheets—Sheet 2.
F. B. STEVENS.
GAGE AND LEVEL INDICATING DEVICE FOR RAILROAD TRACKS.
No. 325,706. Patented Sept. 8, 1885.
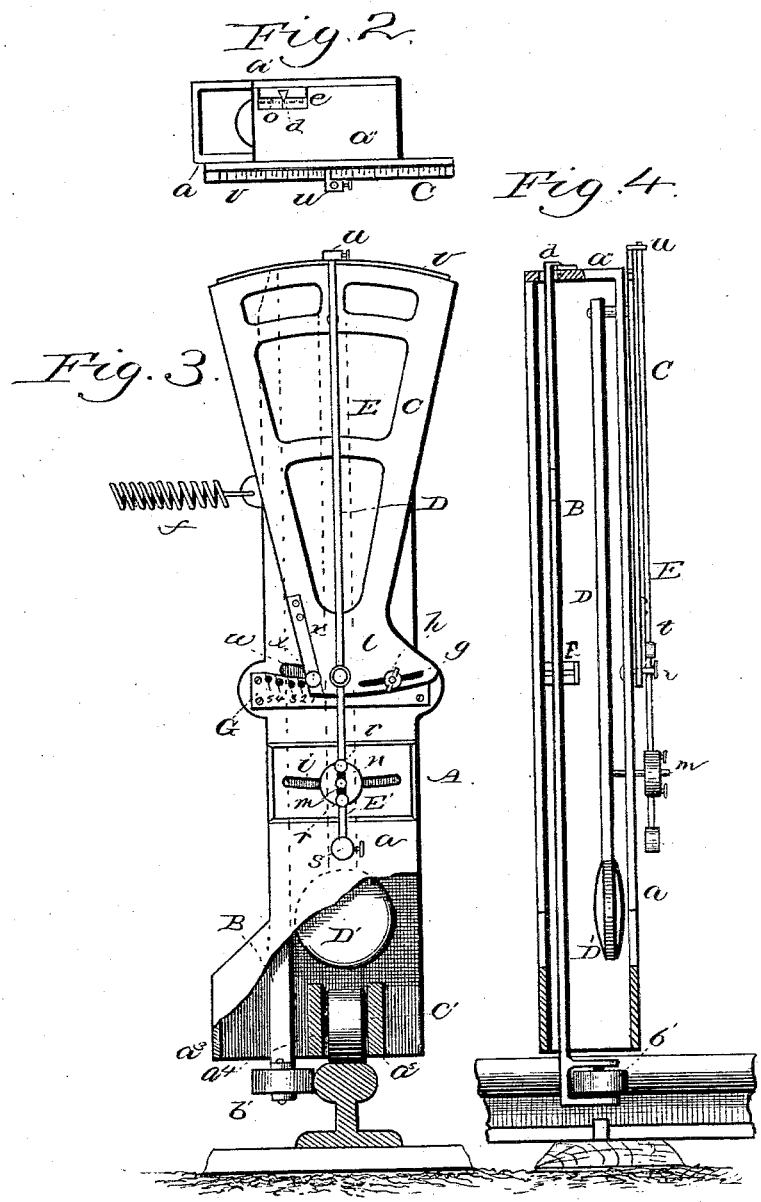
WITNESSES:
INVENTOR
Francis B. Stevens
BY
O. E. Duff
ATTORNEY

UNITED STATES PATENT OFFICE.

FRANCIS B. STEVENS, OF HOBOKEN, NEW JERSEY.

GAGE AND LEVEL INDICATING DEVICE FOR RAILROAD-TRACKS.

SPECIFICATION forming part of Letters Patent No. 325,706, dated September 8, 1885.

Application filed November 15, 1884. (No model.)

*To all whom it may concern:*

Be it known that I, FRANCIS B. STEVENS, of Hoboken, in the county of Hudson and State of New Jersey, have invented certain new and useful Improvements in Gage and Level Indicating Devices for Railroad-Tracks; and I do hereby declare that the following is a full, clear, and exact description of the invention, which will enable others skilled in the art to which it appertains to make and use the same, reference being had to the accompanying drawings, and to the letters of reference marked thereon, which form part of this specification.
This invention has relation to novel mechanism for ascertaining the correct differences of gage between the opposite rails of a railroad-track, and also for indicating actual deviations of level between the rails, whereby their relative positions to each other may be accurately known and the liability of accident to overpassing trains greatly overcome.

The invention consists in such details of construction and combinations of parts as will hereinafter be distinctly described, and pointed out in the claims.

In constructing a machine in accordance with my invention I employ a vertical frame or upright, which is centrally located upon one of the rails of the track, and from which extends a series of rods, braces, or stays, so arranged as to connect with and bear against the opposite rail in such manner as to conform to any difference of width or gage between the two rails, the rods or strips affording by their arrangement a maximum degree of strength to the complete apparatus, and rendering it of extreme lightness in weight, inexpensiveness of cost of manufacture, and furnishing or assisting at the same time in the obtaining of more correct and accurate results from the registering mechanism employed.

The means by which the connecting-frame is kept in constant conformity to the variations of width between the rails is obtained by a spring-actuated lever which carries at its lower end a roller whose plane of rotation is horizontal, and whose periphery abuts or moves against the inner edge or flange of the rail, corresponding rollers being borne by the frame at its opposite side and kept in similar contact with the inner flange of the adjacent rail.

In like manner rollers which revolve in a vertical plane are borne by the frame, so as to move upon or travel the upper surface of the rails, by which any differences or variations of level between the two tracks will be immediately followed, such differences being correctly noted or indicated by the registering devices employed, and which will be described hereinafter. In machines formerly employed for like purposes, so far as I am aware, the variations of level between the tracks have not been noted by actual length or degree, but only the average differences on four bearing-points have been shown. By my machine the operator can at once note the exact deviations without any calculations whatever being necessary.

Referring to the annexed sheets of drawings, Figure 1 represents a perspective view of my complete apparatus, illustrating in connection therewith a carriage or stool, on which the attendant or operator sits when taking down difference of level and gage, the construction and operation of the device being clearly understood therefrom. Fig. 2 represents a top view of the vertical frame or upright in which the pendulum-rod is suspended, and to the outer side of which the movable sector is located and supported. Fig. 3 represents a vertical front elevation of the sector and vertical frame or upright, partly in section, and broken away at the bottom, in order to more clearly indicate the disposition of the several constituent parts, the connecting-frame being detached; and Fig. 4 represents a vertical side elevation of the vertical frame, partly in section, illustrating the suspended rod or pendulum, and also showing the manner of construction thereof.

Reference being had to the several parts by the letters marked thereon, A represents the vertical frame or upright, which is constructed of two sides, $a$ $a'$, a top piece, $a''$, and bottom partitions or connecting-strips, $a^3$ $a^4$ $a^5$. Extending from the inner side of this upright at the bottom are two rods or stays, 1 2, the first leading out at upright angles and the second branching off in a diagonal direction, as shown, their two ends being connected by a horizontal limb, 3, which is parallel to the rail opposite to that on which the frame A is located. In like manner slanting rods or stays 4 5 are connected to and extend from the side of the upright at the top, they being secured to or united with the rods 1 2 at near their free ends, as shown. By this arrangement it will be observed that the several rods form a series of triangular braces, which construction renders the device very strong and less susceptible to jarring and racking in operation.

Owing to the extreme sensitiveness of the devices for registering the variations of gage and level, it is absolutely necessary that the construction of frame-work extending between the rails shall be such as not to communicate to such devices any jar or shivering that they might be subjected to, and I have found the present form to be most advantageous. Again, the precision with which the gaging-rolls are made to act is also greatly increased.

Journaled at each end of the parallel rod or member 3, to the under side thereof, is a roller, $b$, revolving in a horizontal plane, and whose periphery bears and moves against the inner flange of the track-rail; also journaled at the points of junction of the rod 3 with the rods 1 2 and the rods 2 5, in suitable bearings provided therefor, are rollers $c\ c$, which turn in a vertical plane and bear upon or travel the upper surface of the rail, as shown.

Fulcrumed at the point F, between the sides of the upright A, is a lever, B, having journaled at its lower end a roller, $b'$, corresponding to the roller $b$, while at its upper end it passes through an opening in the top piece, $a''$, of the upright, and is provided with an index, $d$. (See Figs. 2 and 4.) Alongside the opening in the top piece, $a''$, is provided a scale, $e$, which is graduated in both directions from the zero-point at the center thereof, the index $d$ moving over the same for indicating differences of width between tracks.

Between the connecting partitions $a^4\ a^5$ at the bottom of the upright A is journaled a vertical roller, $c'$, similar to the rollers $c\ c$ at the opposite side of the track. A strong spiral or other suitable spring, $f$, connects between the lever B above its fulcrum and the rod or member 4 of the connecting frame-work. The tension of this spring forces the roller $b'$ strongly against the inner side of the rail, and the rollers $b$, which move correspondingly against the opposite rail, are consequently caused to bear in like manner against their rail.

By the construction of the apparatus as thus far described it will be obvious that when the same is placed upon the track in such manner as to have the rollers bear upon the inner flanges of the rails and the upper surfaces thereof in the manner hereinbefore explained, and then moved along the track, the most delicate variations of gage can be noted from the index and scale. Where there is a spreading or widening apart of the rails, the spring-actuated lever B will be drawn outward at its upper end, thus throwing its lower roller-bearing arm inward, while at points where the rails incline inward the upper arm of the lever will be forced back, the index noting on the scale the actual or exact extent or degree of variation.

I will now proceed to describe the registering mechanism by which the inequalities of level of the rails may be noted simultaneously with that of variations between the rails, the mechanism hereinbefore described, or at least that much of it which pertains to the proper bearing of the frame-work between the rails, being essential, in connection with such registering mechanism, for proper and accurate results. It will be apparent, however, that the level-indicating devices are not essential to the working of the gaging mechanism, and that the gaging mechanism is not essential to working of the level-indicating devices; but I prefer the employment of both as a complete machine necessary for ascertaining the irregularities of a railway-track.

Mounted on the outer side of the upright A is a sector-plate, C, which is suspended from a pin, $t$, passing through the front side, $d$, of the upright near the top, as shown. Suspended from a pin, between the two sides of the upright, is a pendulum-rod, D, having at its bottom a weight, as D', as shown. The arc of the sector is provided with a scale, $v$, having its zero in the center, and graduated to each side thereof in quarters, eighths, or sixteenths of an inch, as may be desired. (See Fig. 2.) This arc is swept from a center through which the pin $t$ passes, the distance between $t$ and $v$ being the radius of the arc. On the pin $t$ is hung the balanced index-rod, journaled on $t$, and having on its upper extremity an index, $u$, moving over the scale $v$, and also having below the pin $t$, on which it revolves, a slotted disk, $n$, and at its lower extremity a counter-balance, $s$, for it is necessary that the index-rod E shall be balanced, as if made otherwise it would to a certain extent counteract the action of gravity on the pendulum and render the indication of the index inaccurate.

Projecting from the pendulum-rod D, and passing through an opening in the front of the upright, is a pin, $m$, that passes through the slot in the disk $n$, and thus communicates motion from the pendulum to the index-rod. When the irregularities of level between the rails of a straight track are to be ascertained, the sector C is always kept immovably in a fixed position, so that the index shall point to zero when the opposite rails are level. When the irregularities of level on a curved track, where the outer rail is elevated, are to be ascertained, then two methods can be used. First, by using the instrument with the sector C in the same fixed and immovable position that it has when used on a straight track; secondly, by using the instrument after the sector C has been rotated to a given angle and there secured. In the first case the irregularities can only be found by computation. Thus, if the outer rail is set elevated two and a half inches and the instrument registers three and three-eighths inches at any point, then by taking the last amount from the first an irregular elevation of seven-eighths of an inch will be shown. It is to obviate the necessity for such additions or subtractions at each point to be measured that the sector is made movable, and this is done as follows: At its inner or lower extremity the said sector-plate is formed with a slot, g, by which it is movable or adjustable on a set-screw or butterfly-nut, h, which passes through the side a of the upright, and by which it is also tightened, to be held or maintained at the points to which it may be brought; and across the front plate of the upright is arranged and secured a plate, G, having a scale marked thereon. This scale is graduated in both directions, the zero-point being in the center, similar to the scale v on the sector's arc, and the sector may be turned on its pivot, t, to cause its lower side edge or extremity to register with any degree of graduation on the said plate G, and there secured by the butterfly-nut h. When used on a straight track, the edge of the sector is set and fastened at zero on the plate G; but when used to observe irregularities on a curve at a glance and without computation, then when the instrument is on the curve, and when the pendulum has assumed the position due to the elevation at which the outer rail has been set, the bottom edge of the sector C is moved to the right or left of the zero-mark on the plate G, through the same angle to the right or left that the rails are set to differ, and the sector is then firmly secured by the nut h. As the pendulum and sector both revolve on the same pivot t, through the same angle, but in opposite directions, it is obvious that the effect produced on the index-rod E by the movement of the pendulum will be counteracted by the movement of the sector-plate, and that the index will be returned to zero on the scale v.

The operation of the level-indicating devices is as follows: Say, for instance, that at the point of the track at which departure of the apparatus is made the rails are level, or at the same horizontal plane, the butterfly-screw is adjusted to cause the lower edge of the sector to coincide with the zero-mark on the plate G, the pendulum-rod will then be plumb; or, in other words, in a true vertical line, and the index-rod E will be drawn to a position parallel thereto, and the index u will point to zero. Now, if the apparatus is moved along the line of a track, it will be obvious that when a deviation in either of the rails is met with the pendulum, acted upon by gravity, will move the index-rod correspondingly, and thus will the actual extent of the difference be noted on the scale v; and it is also obvious that this actual extent of difference will be noted on a curved track that has the outer rail elevated; but when on such a curved track the irregularity of the track, and not the actual extent of deviation of level of the rails, is required to be noted on the scale v without computation, then when the instrument is on the part of the track at which there is a permanent or known inequality of level between the rails the sector-plate is moved or adjusted through the same angle through which the pendulum has been moved, but in an opposite direction, so that the index-rod will be brought plumb and its index will point to zero. If the apparatus is then moved along the line of the track, the irregularities will be shown at a glance. Thus, supposing that the permanent elevation of the outer rail is two and a half inches, and that an actual elevation of this rail of three and three-eighths inches exists at a given point, then the instrument will register the abnormal elevation of seven-eighths of an inch, and not the actual elevation.

In addition to the butterfly-screw h, the sector may be secured, if deemed necessary, by a pin or stop, x, held at the end of a spring, x', and passing through the plate C into perforations in the plate G.

The index-rod, with its index, disk, and counter-balance, can be made in one piece, and if the disk is sufficiently heavy the counter-balance s can be dispensed with.

The instrument can be adjusted for the gage measurement by slightly moving either the scale e or the index d, or else by slightly altering the position of the roller b'; and it can be adjusted for level measurements by moving either the scale v or index u, or else by altering the position of the roller c'. These adjustments need be but slight.

Although not necessary, it is desirable that the variations of gage and of level should be shown by their actual distances on their respective scales e and v. This is effected on the scale e by placing the fulcrum F midway between the axis of the roller b' and the index d, and the same effect is produced on the scale v by proportioning the distances from t to 1 and from t to m, and the distance from m to the index u.

In the drawings the sector-plate and index-rod are shown at the outside of the plate a; but they may be placed between the plates a and a' by turning c around so that the index-rod will adjoin the pendulum-rod, and so that the pin t shall pass through the plate a from the inside. The sector and index will then project through the top of the upright. Another pin, similar to t, and passing through the plate a on the same line, will then be required to support the pendulum, and the movement of the lower edge of C may be noted through an opening in a. The pendulum-rod D should be heavy enough to operate the several other constituents of the device through the force of gravity when a variation of level between the rails is encountered.

The several parts may be constructed of any suitable material, having in view always the greatest simplicity and lightness, as well as strength and accuracy of proportion.

If the rod or braces are made of steel tubing and the sides $a$ and $a'$ of steel plates, great strength and lightness may be secured.

It will be apparent that the spring-actuated gage-lever and the pendulum and its weight will be protected from injury from contact and the weather by the two sides of the upright.

The frame and its mechanism, as described, is made so as to be pushed from point to point or along the track continuously by the operator, and is also made portable, and so that it can be lifted on and off the rails by him without assistance.

For the purpose of enabling the apparatus to be moved over long distances without tiring or fatiguing the operator, I have constructed a carriage, H, which consists of an oblong frame having journaled between its sides two wheels, $l'$ $l'$, which travel the upper surface of the rail, and which are either flanged or else provided with rollers $p$ $p$, which move against the inner flange of the rail. The frame of the carriage supports a stool, S, which rests upon suitable legs extending up from the sides thereof. The weight of the operator is all borne directly upon the wheels $l'$ $l'$, situated beneath the stool, and does not in any manner interfere with the upright carrying the pendulum and sector, nor with any of the other parts of the apparatus.

The carriage is coupled to the upright A by any suitable connection, as represented at $y$. Projecting centrally from the inner side of the carriage-frame is a rod, 8, which extends over to the opposite rail, its outer end being formed smaller, and passing through an opening in the member 3 of the connecting-frame, a spring, 9, being located on said end, and bearing between 3 and 8 in such manner as to cause the flanges placed on the wheels, or else the rollers $p$ $p$ of the carriage, to bear against the inner flange of the rail on which they travel. In this manner the carriage itself conforms to the difference of gage in a manner approximately to that of the gage mechanism proper, and thus no interference is experienced in the operation of the apparatus.

The entire structure may be propelled by an assistant, or in any suitable manner, and in practice is made or constructed so lightly as to be easily lifted from and again placed upon the rails of a track by the operator and an assistant.

Having thus described my invention, what I claim, and desire to secure by Letters Patent, is—

1. The combination of an upright supported on a roller and having on its top a scale, a spring-actuated lever bearing a roller and index, a movable sector having a scale on its arc, a pendulum, an index-rod operated by the pendulum and bearing an index, a series of rods extending from the upright between the rails and connected by a horizontal rod, and rollers which bear upon the upper and inner surfaces of the rails, substantially as described.

2. The combination of an upright adapted to move upon a rail and having on its top a scale, a lever fulcrumed therein and bearing a roller and index, a series of rods extending from the upright between the rails, a straight or horizontal rod connecting the same, rollers which bear upon and between the rails, and a spring for actuating the lever, substantially as and for the purpose described.

3. The combination of an upright carrying at its upper and lower ends, respectively, a scale and a roller, a spring-actuated lever carrying an index moving over the scale and at its lower end a roller, a series of rods extending from the side of the upright in directions at right angles and diagonally thereto, a horizontal rod connecting the same, and vertical and horizontal rollers borne at their points of juncture for moving upon and against the rails, substantially as described.

4. The combination, with the upright and spring-lever, each bearing a roller, and the horizontal rod 3, and rollers $b$ $c$, of the series of rods extending between said rod and upright, forming thereby sets of triangular connecting-braces, substantially as and for the purpose set forth.

5. The combination, with the upright and its scale, the connecting-braces and rollers, and the spring-actuated lever and its index, of the pendulum and movable sector suspended from the same support, the index-rod operated by the pendulum through a pin-like connection, and a graduated plate for indicating the degree of adjustment of the sector, substantially as described.

6. The combination, with a frame extending between the rails of a track, rollers moving on and against said rails, and mechanism for forcing them in contact therewith, of the pendulum, a movable sector carrying on its arc a scale, an index-rod operated by the movements of the pendulum and carrying an index which moves on the scale, and a graduated plate having graduations at such distances apart as to indicate the actual extent of movement of the sector when brought to conform to known inequalities of level between the rails, substantially as described.

7. The combination, with the upright A, formed in its front side with openings or slots, and provided at its top with an opening and scale and a vertical roller journaled at its bottom, of the spring-actuated lever B, fulcrumed between the sides of the upright and bearing at its upper and lower ends, respectively, an index and horizontal roller, the pendulum suspended, also, between the sides, the sector C, suspended without or within to the pendulum-support, and having slot $g$, index-rod E, and its index, and a set-screw or equivalent for securing the sector at points of adjustment, the whole being borne upon the rails by a suitable connecting-frame and rollers, substantially as described.

8. The combination, with the sector and pendulum, and the upright A, on which they are mounted, of the index-rod, counter-balance *s*, pin *t*, the connection *m*, the slotted disk, and the stem E', substantially as described.

9. The combination, with an apparatus for indicating variation of gage and level of railroad-tracks, of a carriage connected thereto, adapted to travel one rail, and a rod or bar extending from its side to the opposite rail, and a spring and rollers for maintaining said carriage in its position on the track, substantially as described.

10. The combination, with the apparatus and its connecting-frame, constructed substantially as herein described, of the carriage H, bearing the wheels *l' l'*, the side rollers, *p p*, and the seat S, and the rod 8, extending from the side of the carriage and passing through the opposite portion, 3, of the frame, and the spring 9, borne on the end of the rod between said portions, substantially as described.

In testimony that I claim the foregoing as my own I affix my signature in presence of two witnesses.

FRANCIS B. STEVENS.

Witnesses:
FRANCIS B. STEVENS, Jr.,
O. E. DUFFY.